(12) United States Patent
Khan et al.

(10) Patent No.: US 8,683,564 B2
(45) Date of Patent: Mar. 25, 2014

(54) ONE-TIME PASSWORD AUTHENTICATION WITH INFINITE NESTED HASH CLAIMS

(75) Inventors: Muhammad Khurram Khan, Riyadh (SA); Mohamed Hamdy Khalil Eldefrawy, Riyadh (SA); Khaled Soliman Alghathbar, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 13/806,127

(22) PCT Filed: Nov. 17, 2010

(86) PCT No.: PCT/US2010/057125
§ 371 (c)(1),
(2), (4) Date: Jun. 26, 2013

(87) PCT Pub. No.: WO2012/005744
PCT Pub. Date: Jan. 12, 2012

(65) Prior Publication Data
US 2013/0191899 A1    Jul. 25, 2013

Related U.S. Application Data

(60) Provisional application No. 61/358,929, filed on Jun. 27, 2010.

(51) Int. Cl.
*H04L 29/06* (2006.01)
*G06F 21/00* (2013.01)

(52) U.S. Cl.
USPC .............................................. 726/6; 713/168

(58) Field of Classification Search
USPC .............................................. 713/184; 726/4
See application file for complete search history.

(56) References Cited

U.S. PATENT DOCUMENTS

2009/0119759 A1    5/2009    Taugbol
2009/0172775 A1    7/2009    Mardikar et al.
2009/0222669 A1    9/2009    Huang et al.

*Primary Examiner* — Gilberto Barron, Jr.
*Assistant Examiner* — Devin Almeida
(74) *Attorney, Agent, or Firm* — James A. Sheridan; Hart IP Law & Strategies

(57) ABSTRACT

Systems and methods for One-Time Password (OTP) authentication with infinite nested hash chains are described. In one aspect, a methodology includes a client device that provides a one-time password (OTP) authentication server with certain registration information. The client device generates, via the OTP authentication server, an authenticated OTP with infinite nested hash chains, These generating operations use a first hash function (hA (−)) for updating a seed chain, a second hash function ($h_B$ (•)) for OTP production, an OTP seed number $s_t^{OTP}$ for a $t^{th}$ authentication, and two authentication seeds of numbers $s_{2t-1}^{Auth}$ and $s_{2t}^{Auth}$, for the $t^{th}$ authentication.

20 Claims, 6 Drawing Sheets

ONE-TIME PASSWORD AUTHENTICATION WITH INFINITE NESTED HASH CLAIMS

BACKGROUND

Due to large-scale proliferation and use of online banking, shopping, and secure Internet transactions, sophisticated forms of online theft are increasing. As a result, many online systems utilize authentication algorithms to determine whether a given user is who they claim to be. Authentication is the cornerstone of information security since a weak authentication mechanism substantially increases system security risks. Conventional authentication mechanisms typically use one or more of the followings four factors [1]:

User knowledge such as a password and/or Personal Identification Number (PIN).
User possessions such as a smart card and/or token.
User personal information such as a fingerprint.
User behavioral characteristics such as a signature and/or voice.

Password based authentication is the most widely used of the above four methods because of its simplicity and low cost. A one-time password mechanism solves the password security problem that could result from reusing the same password multiple times.

Two-factor authentication mechanisms have been adopted by some online banking systems as a proposed solution to address increased security risks. Two-factor authentication utilizes, for example, Short Message System (SMS) services to send messages that contain a One Time Password (OTP) to a mobile consumer. Traditional SMS-OTP works by sending SMS message to a mobile consumer contains OTP used to complete the processing. However, such conventional techniques are substantially limited in view of SMS cost, spying, delay, and roaming restrictions. Self-generated OTP systems were introduced to address these and other shortcomings. However, self-generated OTP systems are also limited in application. For example, self-generated OTP systems are typically based on an internal clock synchronized a main server. Due to the general nature of mobile phones (e.g., out of network, etc.), however, such synchronization cannot typically be guaranteed.

Accordingly, new solutions for mobile telephony subscribers that utilize SMS have been proposed. One proposed solution utilizes backward hash chains to generate an OTP for authentication purposes. This proposed solution, however, generally requires intensive computation on the multiple if any client, which typically has limited computational resources. Additionally, there is a restriction in the length of the chain. Another proposed solution suggests utilization of signature chains to address the chain length restriction by involving public key techniques. This latter proposal, however, also increases computation costs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Systems and methods for One-Time Password (OTP) authentication with infinite nested hash chains are described. In one aspect, a methodology includes a client device that provides a one-time password (OTP) authentication server with certain registration information. The client device generates, via the OTP authentication server, an authenticated OTP with infinite nested hash chains, These generating operations use a first hash function ($h_A(\cdot)$) for updating a seed chain, a second hash function ($h_B(\cdot)$) for OTP production, an OTP seed number $s_t^{OTP}$ for a $t^{th}$ authentication, and two authentication seeds of numbers $s_{2t-1}^{Auth}$ and $s_{2t}^{Auth}$, for the $t^{th}$ authentication.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Overview

Conventional OTP Schemes

Figure 1:
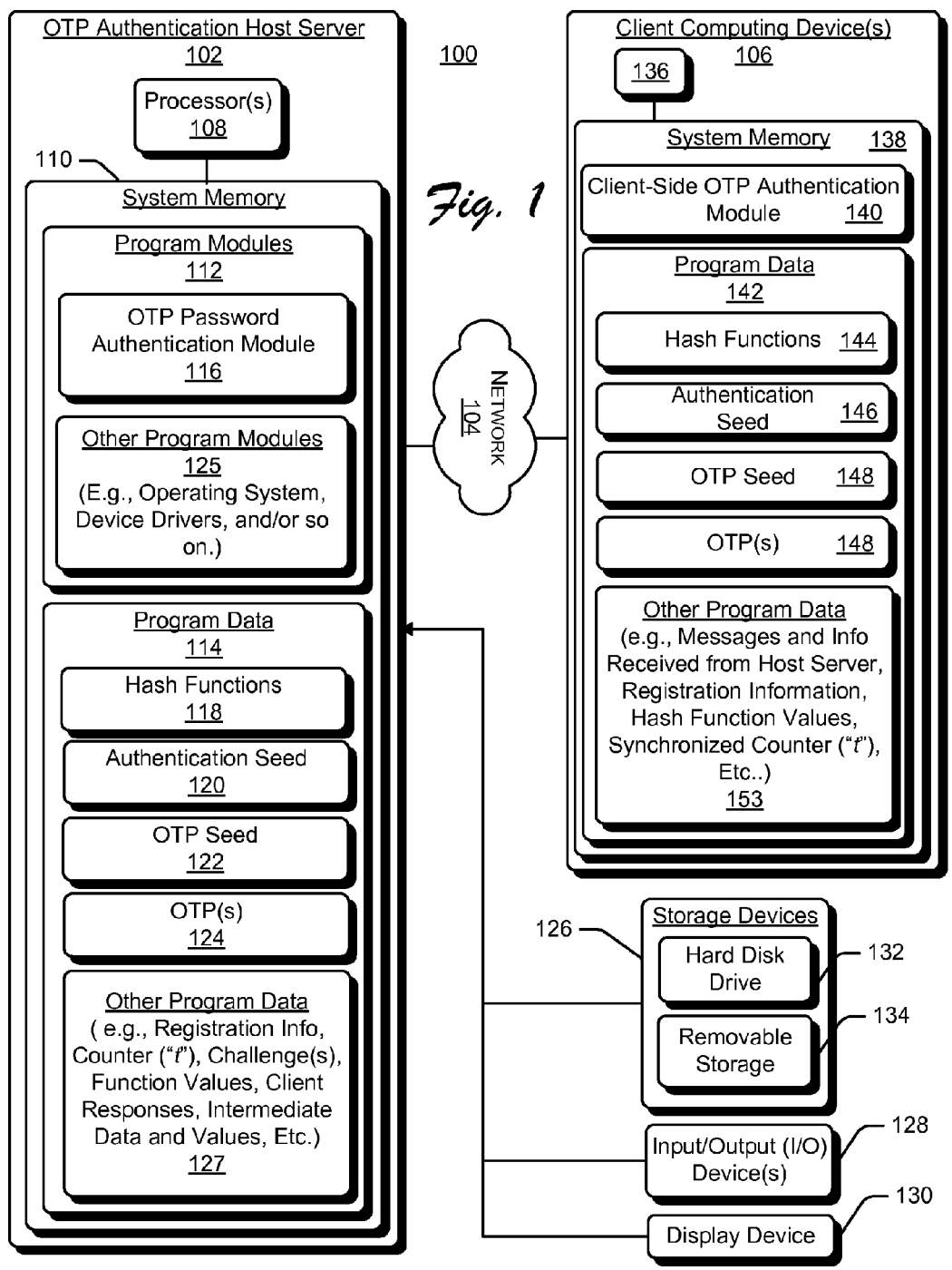
FIG. 1 illustrates an example system environment capable of implementing the systems and methods described herein for one-time password authentication with infinite nested hash chains, according to one embodiment.

For purposes of general overview, hash functions $h(\cdot)$ are useful in the construction of OTPs and are defined straightforwardly as one-way hash functions (OWHFs) such that, given an input string, x, it is easy to compute $y=h(x)$ and, conversely, it is computationally infeasible to get $x=h^{-1}(y)$ given a randomly chosen y. The following subsection presents some of the conventional schemes for OTPs and their respective shortcomings.

Lamport's Scheme: Lamport initially proposed the idea of using hash chains for OTP authentication purposes [2]. Later, hash chains where utilized in an S/Key™ OTP system [3]. Such a system generally involves applying hash function $h(\cdot)$ for N times to a seed (s) to form a hash chain of length N:

$$h^1(s), h^2(s), \ldots, h^{N-1}(s), h^N(s) \qquad (1)$$

The $t^{th}$ authentication host sends a challenge to the user:

$$\text{Challenge}(t) = N - t \qquad (2)$$

Then the user calculates the $t^{th}$ OTP according to this challenge:

$$OTP_t(s) = h^{N-t}(s) \qquad (3)$$

The host authenticates the user by checking that the following equality holds:

$$h(OTP_t(s)) = h^{N-t+1}(s) \qquad (4)$$

The value $h^{N-t+1}(s)$ is already saved in the host system's password file from the previous $t-1^{th}$ authentication. After any successful authentication in this scenario, the system password file is updated with the OTP that was saved before the host final hash execution as $h^{N-t}(s)$. In our case, the host then increments t by one and sends a new challenge to the user for the next authentication.

This S/Key™ OTP authentication scheme has a limitation on the number of authentications. More specifically, after reaching N authentications, the scheme requires a process restart. In addition, this conventional technique is vulnerable because an opponent impersonating the host can send a challenge with a small value to the user, who responds with the hash chain initial values, which would then allow the intruder to calculate further OTPs [6]. This attack is commonly referred to as a small challenge attack. In addition, the user computational requirements are high, especially during the chain initial values, which make the system unsuitable for devices with limited resources.

Goyal et al.'s Scheme (hereinafter also referred to as Goyal's Scheme): To decrease the computational cost in [7], Goyal et al. proposed a new idea of dividing this large N value into $\lfloor N/R \rfloor$ sub periods of length R to share this cost with the host itself. Here, N is a multiple of R to simplify the scheme's formula:

$$OTP_{N-t}(s) = OTP_{k+n}(s) = h^n(OTP_k(s) + \beta s) \qquad (5)$$

$$\text{where } \beta = \begin{cases} 1 & k \bmod R = 0 \\ 0 & \text{Otherwise} \end{cases}$$

Suppose the user wishes to authenticate himself to the host for the $t^{th}$ time.

$$n = (N-t) \bmod R|_{n \neq 0}, \text{ and } k = N-t-n \qquad (6)$$

User identifies himself to the host by logging. Host sends this pair of values to the user $(n, OTP_k(s))$. User calculates $OTP_{k+n}(s)$ and sends it back to the host as an OTP that is equal to $h^n(OTP_k(s)+s)$. Host stores the last OTP to hash the received OTP and compare it with the stored one. The next time user wants to login, he will be prompted with values of t+1. The user must have a knowledge of "s" during every login, which makes it essential to cipher the "s" seed. Re-initialization after N authentications is still necessary as in Lamport's scheme.

Bicakci et al.'s Scheme (hereinafter also referred to as Bicakci's Scheme): The Infinite Length Hash Chains (ILHC) proposed by [8] use a public-key algorithm, A to produce a forward and infinite one-way function (OWF). This OWF is the OTP production core. Bicakci et al. proposed a protocol using Rivest, Shamir and Adleman (RSA) algorithm for public-key cryptography [9], where d is the private key and e is the public key. The OTP originating from initial input "s" using the RSA public-key algorithm for the $t^{th}$ authentication is:

$$OTP_t(s) = A^t(s,d) \qquad (7)$$

and the verification of the $t^{th}$ OTP is done by $$OTP_{t-1}(s) = A(OTP_t, e) \qquad (8)$$

Increasing the number of cascaded exponentiations increases the computational complexity, making this algorithm very difficult to implement in limited computation devices, e.g., mobile devices [10], etc.

Yeh et al.'s Scheme (hereinafter also referred to as Yeh's Scheme): Yeh's Scheme [11] is divided into three phases: registration, login, and verification. In the registration phase, a user and a host set up a unique seed value "s" and the number of login times, N. After setting up s and N, the user computes an initial password $OTP_0 = h^N(K \oplus s)$, where h(•) is a hash function, K is a pass-phrase of the user, and $\oplus$ is a bitwise XOR function. The steady state authentication for the $t^{th}$ login time is shown in TABLE 1.

TABLE 1

Yeh et al.'s scheme.

Resgistration Phase

User ← Host:s
User ← Host:N, s $\oplus$ $D_0$, $h(D_0)$
User ← Host:$OTP_0 \oplus D_0$ Login Phase User ← Host:$(S_{t,1}, S_{t,2}, S_{t,3}) = (N - t, s \oplus D_t, h(D_t) \oplus OTP_{t-1})$
User ← Host:$U_t = h^{N-t}(K \oplus s) \oplus D_t = OTP_t \oplus D_t$ Verification Process $$\text{Host:} h((OTP_t \oplus D_t) \oplus D_t) \stackrel{?}{=} OTP_{t-1}$$

Referring to TABLE 1, and for the $t^{th}$ login, the host sends a challenge to the user with a random number, $D_t$, the $D_t$ hashing value, $h(D_t)$, the shared secret, "s" and a stored value, $OTP_{t-1}$. After validating the challenge, the user responds with $OTP_t \oplus D_t$. Finally, the host checks this response and replaces the stored value $OTP_{t-1}$ with $OTP_t$.

This particular scheme is generally vulnerable to a pre-play attack [12] because of transferring password information in the both directions for the host and user. An attacker potentially has the ability to impersonate the host to the user (by sending the user a forged challenge). After that, the attacker impersonates the user to the host using the new valid password-authenticator sent to him previously by the user [12]. In addition, [6] showed that Shen et al.'s scheme is practically the same as that in [2], but uses the closing of sensitive parts of transmitted messages with the help of the XOR operation, a hash function, and a random nonce. Finally, the calculation of the hash function numbers for the $t^{th}$ login is equal to N-t, from the user side. This shows the algorithm's computational cost. Again, re-initialization after N authentications is still necessary.

Chefranov's Scheme: The scheme proposed in [6] is divided into several complicated phases: a registration phase, and a login and authentication phase. In the following table, we show the procedure for the first run.

TABLE 2

Registration Phase

| | |
|---|---|
| Host: | Set $n_H = 0$, |
| | Generate random seed $s_H$ |
| User: | Set $n_U = 0$, |
| | Generate random seed $s_U$ |
| | Generate random nonce $D_{1U}$ |
| | K is the password phrase |
| User ← Host: | $s_H$ |
| User → Host: | $s_U$ |
| User calculate: | $\pi = h(K \oplus s_H), \pi_1 = h(\pi)$ |

TABLE 2-continued

| | |
|---|---|
| User → Host: Login and Authentication Phase | $p_1 = h(\pi_1)$ |
| User → Host: | $S_1 = (S_{1.1}, S_{1.2}, S_{1.3}, S_{1.4}) = \begin{pmatrix} \pi_1 \oplus h(D_{1U}), \\ h(\pi \oplus p_1) \oplus h(D_{1U}), \\ h^2(\pi \oplus p_1) \oplus D_{1U}, \\ s_U \oplus D_{1U} \end{pmatrix}$ |
| Host check: | $h(S_{1.1} \oplus h(s_U \oplus S_{1.4})) \stackrel{?}{=} p_1$ |
| | $h(S_{1.2} \oplus h(s_U \oplus S_{1.4})) \stackrel{?}{=} S_{1.3} \oplus D_{1U}$ |
| Host calculate: | $D_{2U} = D_{1U} + 1$ <br> $p_1 = S_{1.2} \oplus h(D_{1U})$ <br> $n_H = n_H + 1$ |
| User ← Host: | $(S_{2.1}, S_{2.2}) = (D_{2U} \oplus s_H, D_{2U} \oplus s_U)$ |
| User check: | $S_{2.1} \oplus s_H \stackrel{?}{=} S_{2.2} \oplus s_U \stackrel{?}{=} D_{1U} + 1$ |
| User update: | $\pi_2 = h(\pi_1) \oplus \pi, n_H = n_H + 1,$ <br> $p_2 = h(\pi_2)$ |
| User → Host: | $p_2$ to start the second session. |

Referring to TABLE 2, the password generation procedure for $t^{th}$ authentication is $\pi_t = \pi \oplus h(\pi_{t-1})$ from the user side, and $p_t = h(\pi_t)$ from the host side. The author of this algorithm claimed that the user is occupied by only four hash function calculations, but actually, he has to do more than this. Considering a steady state session, through the second phase, the $S_t$ vector itself has three hash operations, $h(D_{tU}), h(\pi \oplus p_t)$, and $h^2(\pi \oplus p_t)$. Two additional hash operations are required for the user updating of OTPs, $\pi_{t+1} = \pi \oplus h(\pi_t)$ and $p_{t+1} = h(\pi_{t+1})$, which must be done by the user itself. After that, the user starts the $t+1^{th}$ by sending $p_{t+1}$ to the host in the registration phase.

Novel OTP Authentication with Infinite Nested Hash Chains

Systems and methods for OTP authentication with infinite nested hash chains are described below in reference to FIGS. 1 through 6. The systems and methods address the limitations of conventional OTP-based authentication techniques described above (e.g., Lambert's, Goyal's, Yeh's, and Chefranov's Schemes, etc.) for mobile telephony devices by implementing two "2" different nested hash chains: one hash function $h_A(\bullet)$ for a seed chain updating and another hash function $h_B(\bullet)$ for OTP production. The systems and methods provide forward and non-restricted OTP generation independent of: (a) timestamps from clock synchronization operations; (b) any hash chain length restriction; (c) costly computational functions (e.g., use of backward hash chains); (d) SMS associated risks in this context (e.g., spying, and delay, and roaming restrictions); and (e) public-key cryptography. In one implementation, the systems and methods implement a random challenge-response operation mode.

An Exemplary System

FIG. 1 illustrates an example system 100 capable of implementing the systems and methods described herein for one-time password ("OTP") authentication with infinite nested hash chains, according to one embodiment. System 100 includes OTP authentication host server 102 (hereinafter sometimes referred to as "host server" or "host") operatively coupled over network 104 to one or more client computing devices 106 (hereinafter sometimes referred to as "client device" or "user"). Server 102 represents any type of computing device such as a network server, a workstation, a desktop computer, a laptop, and/or so on. Network 104 represents any type of data communications network, such as any combination of a local area network (LAN), wide area network (WAN), a telephony network, and/or the Internet. In particular embodiments, data communication network 104 is a combination of multiple networks communicating data using various protocols across any communication medium. Client device(s) 106 represent any type of computing device, such as a mobile telephone, a smart phone, a handheld computing device, a Personal Digital Assistant (PDA), general-purpose computer, a tablet computer, a workstation, a laptop computer, a game console, a set top box, and/or so on. As discussed herein, server 102 and client computing device(s) 106 respectively send and receive messages via network 104 to implement one-time password authentication with infinite nested hash chains.

Although FIG. 1 illustrates one host server 102 and one client computing device 106, alternate embodiments of system 100 may include any number of host servers 102 and client computing devices 106 and any number of other computing systems coupled together via any number of data communication networks 104 and/or communication links. For example, in one implementation, network 104 includes a telecommunications network such as one based on Global System for Mobile Communications (GSM) standard to provide client computing device(s) 106 with telephony services and value-added services such as Simple Message Service (SMS) messaging services for novel OTP authentication services such as those described herein via host server 102. In other embodiments, server 102 is replaced with a group of computing devices.

Host server 102 includes one or more processor(s) 108 operatively coupled to a tangible computer readable memory (system memory) 110 including program modules 112 and program data 114. Processor(s) 108 may also include various types of computer-readable media, such as cache memory. System memory 110 represents various computer-readable media, such as volatile memory (e.g., random access memory (RAM)) and/or nonvolatile memory (e.g., read-only memory (ROM)). System memory 110 may also include rewritable ROM, such as Flash memory. Host server program modules 112 include computer-program instructions executable by processor(s) 108 to perform operations in system 100 associated with OTP authentication with infinite nested hash chains, as described herein. For example, program modules 112 include OTP password authentication module 116 to provide OTP password authentication with infinite nested hash chain services to client computing devices 102. The service initially is provided responsive to receiving an authentication registration request from a client computing device. As part of the authentication process, the host provides the client with two different one-way hash functions 118, an authentication seed 120, and an OTP seed 122 for verification of OTP(s) 124. This authentication process is described in greater detail below in reference to FIGS. 2 through 6.

Host server program modules 112 further include, for example, other program modules 125 such as an operating system, device drivers, other applications and interfaces, etc. Examples of other applications and interface(s) in "other program modules" 212 include any number of different network interfaces, such as interfaces to local area networks (LANs), wide area networks (WANs), wireless networks, telephony networks, and the Internet. Other interfaces include user interface and peripheral device interface.

In this exemplary implementation, host server 102 is operatively coupled to one or more storage devices 126, one or more I/O device(s) 128, and a display device 130. Storage device(s) 126 include various computer readable media, such as magnetic tapes, magnetic disks, optical disks, solid state memory (e.g., Flash memory), and so forth. In this exemplary implementation, a particular storage device is a hard disk drive 132. Various drives may also be included in storage device(s) 126 to enable reading from and/or writing to the various computer readable media. Storage device(s) 126 include removable storage/media 134 and/or non-removable media. Various I/O devices 128 allow data and/or other information to be input to or retrieved from host server 102. Example I/O device(s) include cursor control devices, keyboards, keypads, microphones, monitors or other display devices, speakers, printers, network interface cards, modems, lenses, CCDs or other image capture devices, and the like. Display device 130 includes any type of device capable of displaying information to one or more users of host server 102. Examples of display device 130 include a monitor, display terminal, video projection device, and the like.

Client device 106 includes one or more processor(s) 136 operatively coupled to a tangible computer readable memory (system memory) 138. Processor(s) 136 may also include various types of computer-readable media, such as cache memory. Memory 138 represents various computer-readable media, such as volatile memory (e.g., random access memory (RAM)) and/or nonvolatile memory (e.g., read-only memory (ROM)). Memory 138 may also include rewritable ROM, such as Flash memory. Memory 138 includes computer-program modules such as Client-side OTP authentication module 140 and program data 142. Module 140 includes computer-program instructions executable by processor(s) 136 to perform client-side operations in system 100 for OTP authentication with infinite nested hash chains, as described herein. In one implementation, for example, module 140 is operatively configured to register for authentication services with the host server 102, to respond to authentication challenge(s) received from host server 102, and other operations associated with OTP authentication procedures with nested infinite hash chains, as described herein.

Program data 142 includes, for example, two different one-way hash functions 144, an authentication seed 146, and an OTP seed 148 for the generations of OTP(s) 150. These program data have been generated according to the client unique parameters, and then delivered to client.

Exemplary Procedures

FIGS. 2 through 6 illustrate exemplary operations for OTP authentication with infinite nested hash chains, according to various embodiments. The following procedures use respective ones of the following notations:

$h_A(\cdot)$ represents a first hash function;

$h_B(\cdot)$ represents a second hash function;

$s_{2t-1}^{Auth}$ is an authentication seed number 2t−1 for the $t^{th}$ authentication;

$s_{2t}^{Auth}$ is an authentication seed number 2t for the $t^{th}$ authentication;

$s_t^{OTP}$ is an OTP seed number t for the $t^{th}$ authentication;

$OTP_t$ is a OTP number t for the $t^{th}$ authentication;

$(v_{t,1}, v_{t,2})$ is the challenge vector for a $t^{th}$ authentication sent by host server 102 (host) to client device 106 (user);

$w_t$ is a response vector for a $t^{th}$ authentication sent by user to host;

$(x_t, y_t)$ is the nested hashing progress values for a $t^{th}$ authentication; and $h_B^{y_t}(h_A^{x_t}(s_t^{OTP}))$ represents hashing an OTP seed number t by $h_A(\cdot)$ for $x_t$ times followed by $h_B(\cdot)$ hashing for $y_t$ times.

In general, and as described in greater detail below, OTP production is generated as shown in TABLE 3 below, and according to the following equation:

$$h_B^y(h_A^x(s))|_{x:1\to\infty, y:1\to\infty} \qquad (9)$$

TABLE 3

Exemplary OTP Generation with a Nested Hash Chain Using Two Different Hashes

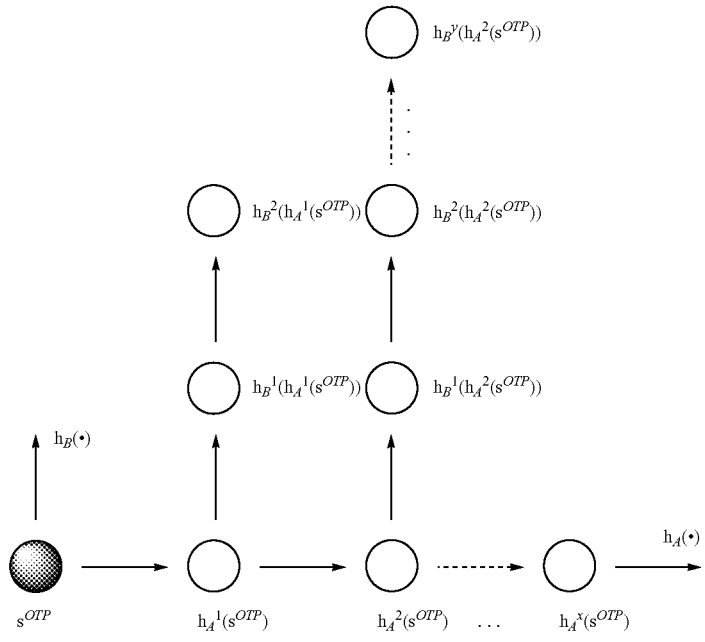

Operational aspects of TABLE 3 are now described in greater detail in reference to FIGS. 2 through 6.

Figure 2:
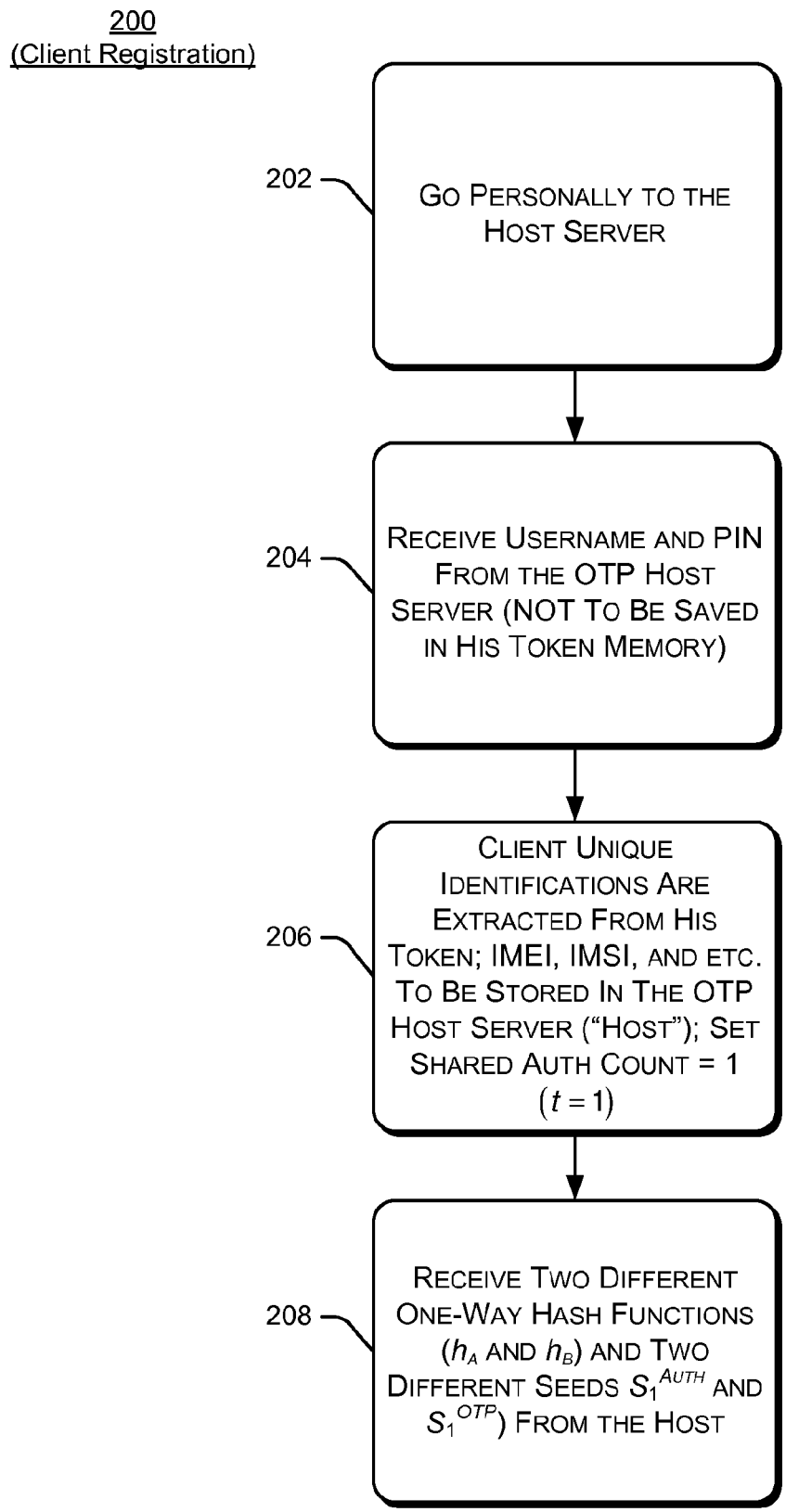
FIG. 2 illustrates an exemplary procedure for client-side registration associated with OTP authentication with infinite nested hash chains, according to one embodiment.

FIG. 2 illustrates an exemplary procedure 200 for client-side registration associated with OTP authentication with infinite nested hash chains, according to one embodiment. Client type inside operations or those implemented by a client-computing device 106 of FIG. 1, for example, by computer-program instructions specified by client-side OTP authentication module 140. In the figures, the left-most digit of a reference number identifies the figure in which the reference number first appears. The use of the same reference numbers in different figures indicates similar or identical items or features. For example, the leftmost digit of the reference number for client-computing device 106 is a "1," indicating that this component was first introduced in FIG. 1.

Referring to FIG. 2, at block 202 the procedure prompts the user to deal personally with host server for the registration process. In one implementation, the required information for the registration process is a user name and a personal identification number (PIN). At block 204, the procedure receives the registration information from the user. At block 206, the procedure implements a registration phase with the host server 102 and set a shared/synchronized authentication counter "t" to one "1". The registration phase is accomplished by sending the host server the received registration information (e.g., username and PIN) in an authentication registration request. Where the client device 106 is a mobile telephone, the authentication registration request may also include an International Mobile Equipment Identity (IMEI) and an International Mobile Subscriber Identity (IMSI).

Responsive to registering with the host server for authentication (block 206), operations of block 208 receive, by the client device 106, a response from the host server 102. The authentication request response includes two different hashes functions and two different seeds. One hash function $h_A(\bullet)$ is received by the client device for seed chain updating and another hash function $h_B(\bullet)$ is received for client device OTP production. Regarding the different received seeds, one seed $s_1^{OTP}$ is received for OTP production, and the other seed $s_1^{Auth}$ is received for the authentication procedure. To ensure that information is completely shared with the service provider, these two seeds are produced by the shared and unique parameters of the host (102) and user (106).

Figure 3:
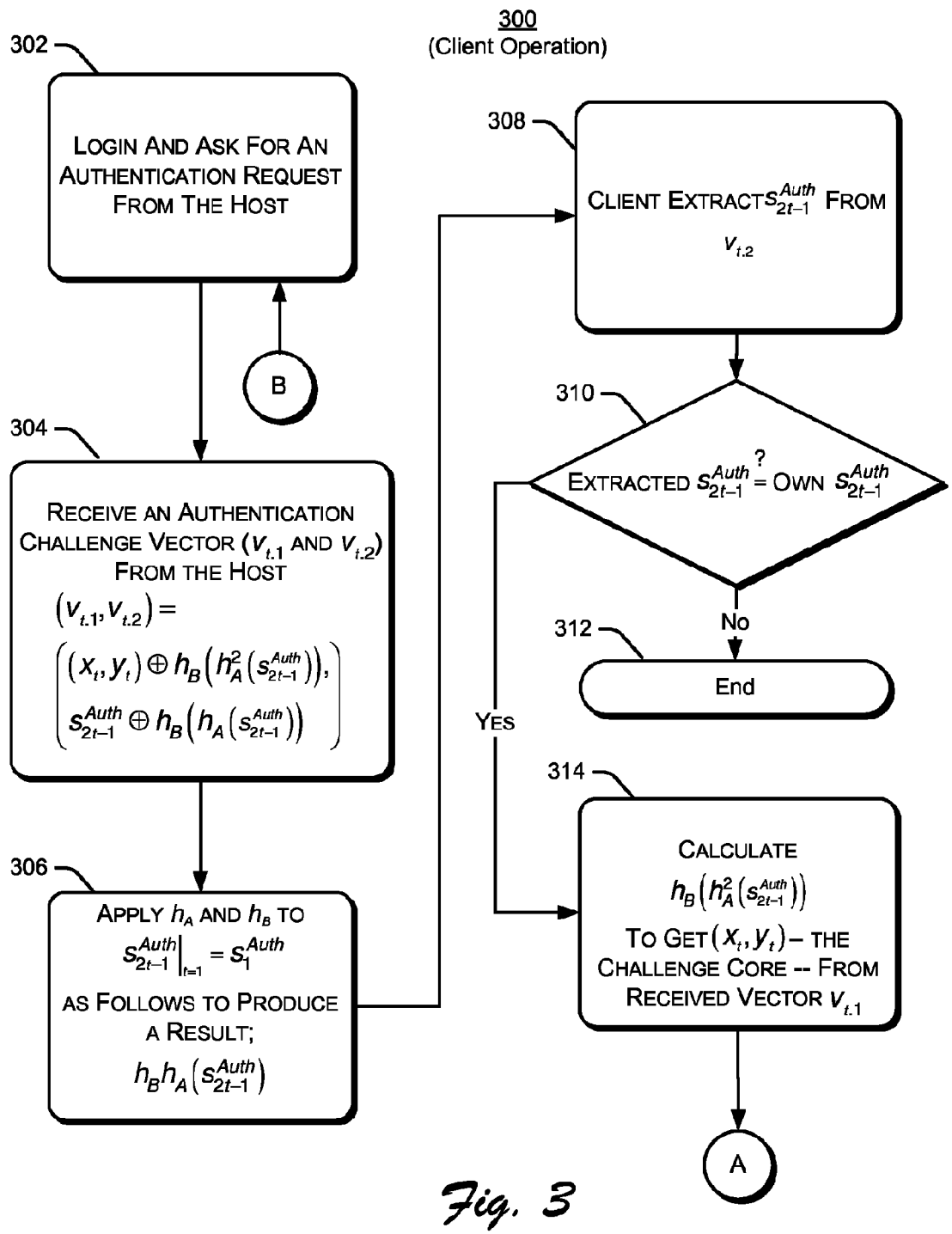
FIG. 3 shows an exemplary procedure for client-side operations associated with OTP authentication with infinite nested hash chains, according to one embodiment.

FIG. 3 shows an exemplary procedure 300 (continued from FIG. 2) for client-side operations associated with OTP authentication with infinite nested hash chains, according to one embodiment. At block 302 user logins using his username and PIN to start an authentication process with the host. At block 304, the procedure receives an authentication challenge vector set from the host server 102. In particular, and for the first time of the authentication process, t=1, the host sends a challenge to the user of:

$$((x_1,y_1) \oplus h_B(h_A^2(s_1^{Auth})), s_1^{Auth} \oplus h_B(h_A(s_1^{Auth}))) \quad (10)$$

Generally:

$$((x_t,y_t) \oplus h_B(h_A^2(s_{2t-1}^{Auth})), s_{2t-1}^{Auth} \oplus h_B(h_A(s_{2t-1}^{Auth}))) \quad (11)$$

At block 306, the user calculates $h_B(h_A(s_{2t-1}^{Auth}))$ according to his knowledge of the hash functions, $h_A(\bullet)$ and $h_B(\bullet)$, and also the authentication seed, $s_{2t-1}^{Auth}$. At block 308, the procedure extracts $s_{2t-1}^{Auth}$ from $v_2$ and compares it with his own $s_{2t-1}^{Auth}$. This comparison guarantees the integrity of the received vector $(v_{t.1},v_{t.2})$. At block 310, the procedure determines whether the extracted $s_{2t-1}^{Auth}$ is equal to the locally owned value or not. If there is no equivalence, the procedure ends at block 312 (i.e., the client device 102 terminates the procedure). Otherwise, the procedure continues at block 314, where the client device calculates:

$$h_B(h_A^2(s_{2t-1}^{Auth}))$$

to get $(x_t,y_t)$ from the received vector $v_{t.1}$. The procedure continues at FIG. 4 as illustrated by on-page reference "A."

Figure 4:
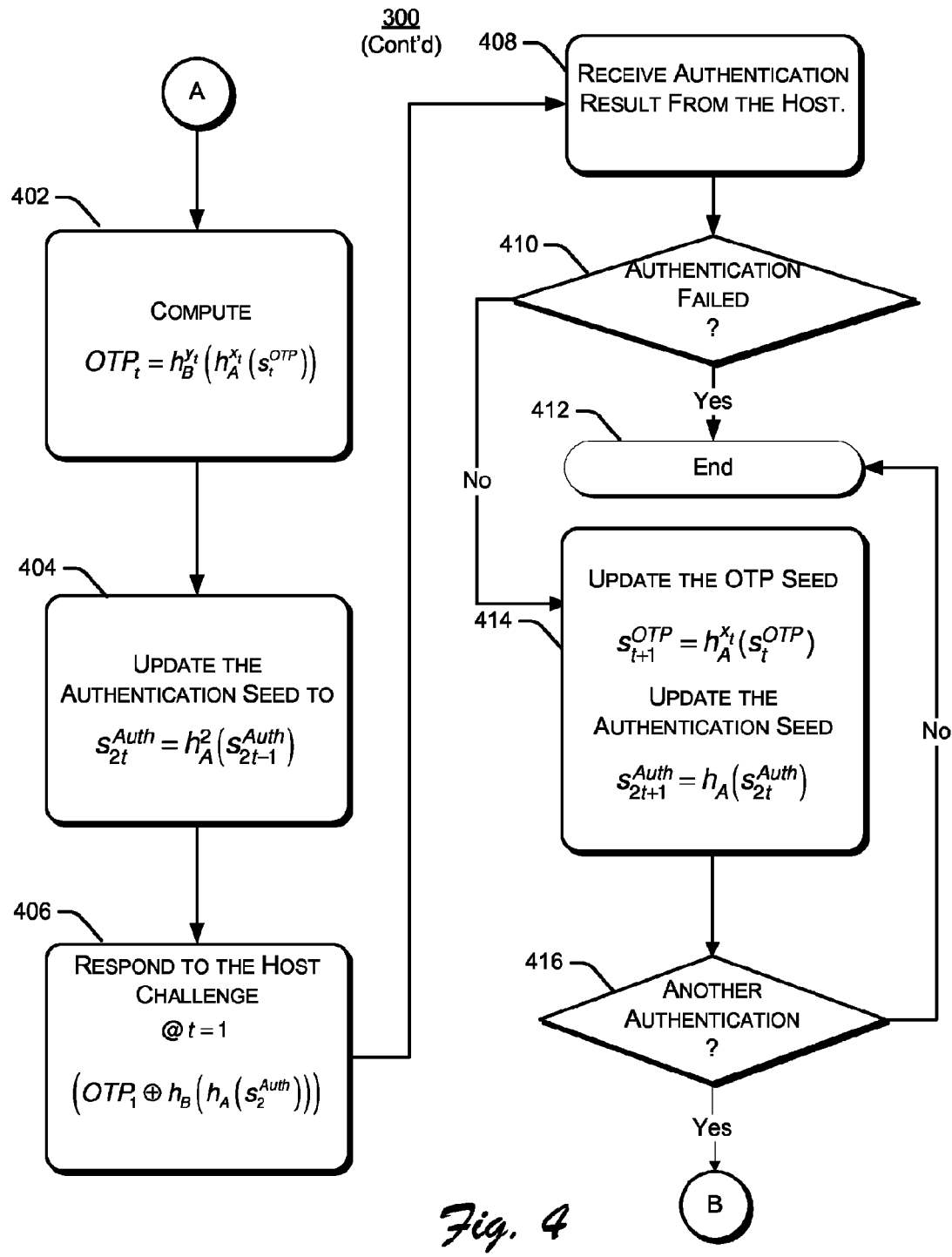
FIG. 4 shows further aspects of an exemplary procedure of FIG. 3 for client-side operations associated with OTP authentication with infinite nested hash chains, according to one embodiment.

FIG. 4 shows further aspects of an exemplary procedure 300 (continued from FIG. 3) for client-side operations associated with OTP authentication with infinite nested hash chains, according to one embodiment. At block 402, the client computing device 106 calculates:

$$OTP_t = h_B^{y_t}(h_A^{x_t}(s_t^{OTP})). \quad (12)$$

The $(x_t,y_t)$ values are the challenge core; these values determine the nested hashing progress. In one implementation, these values are obtained by one stepping. In another implementation, these values are randomly selected by the host server 102. In addition, the value of this current password $OTP_t$ is calculated by the host 102 and user device 106 in parallel. At block 404, and after the user determines the initial session $OTP_t$, the authentication seed is updated to be:

$$s_{2t}^{Auth} = h_A^2(s_{2t-1}^{Auth}). \quad (13)$$

As described below in procedure 500 of FIGS. 5 and 6, the host also updates this value substantially in parallel with the client device.

At block 406, the client device 106 responds to the host challenge (e.g., please see the operations of block 304 of FIG. 3) with his $OTP_t$, for example we consider t=1, in the following form:

$$(OTP_1 \oplus h_B(h_A(s_2^{Auth}))) \quad (14)$$

At this point, the host 102 calculates $h_B(h_A(s_2^{Auth}))$ to extract the received $OTP_1$ and compares it with its own calculated $OTP_1$. At block 408, the client device receives the authentication result from the host. At block 410, it is determined whether the authentication was successful. If not, operations continue at block 412, wherein the authentication session is terminated. Alternatively, if the authentication was successful at block 410), operations continue at block 414, wherein both the user and host update the OTP seed to get $s_2^{OTP} = h_A^{x_1}(s_1^{OTP})$ and the second authentication seed is updated to $s_3^{Auth} = h_A(s_2^{Auth})$. Those two values $s_2^{OTP}$ and $s_3^{Auth}$ are the next session initial seeds. This is the procedure for a complete session. At block 416, if another authentication session is desired, operations continue in FIG. 3 at block 302 as indicated by on-page reference "B."

Figure 5:
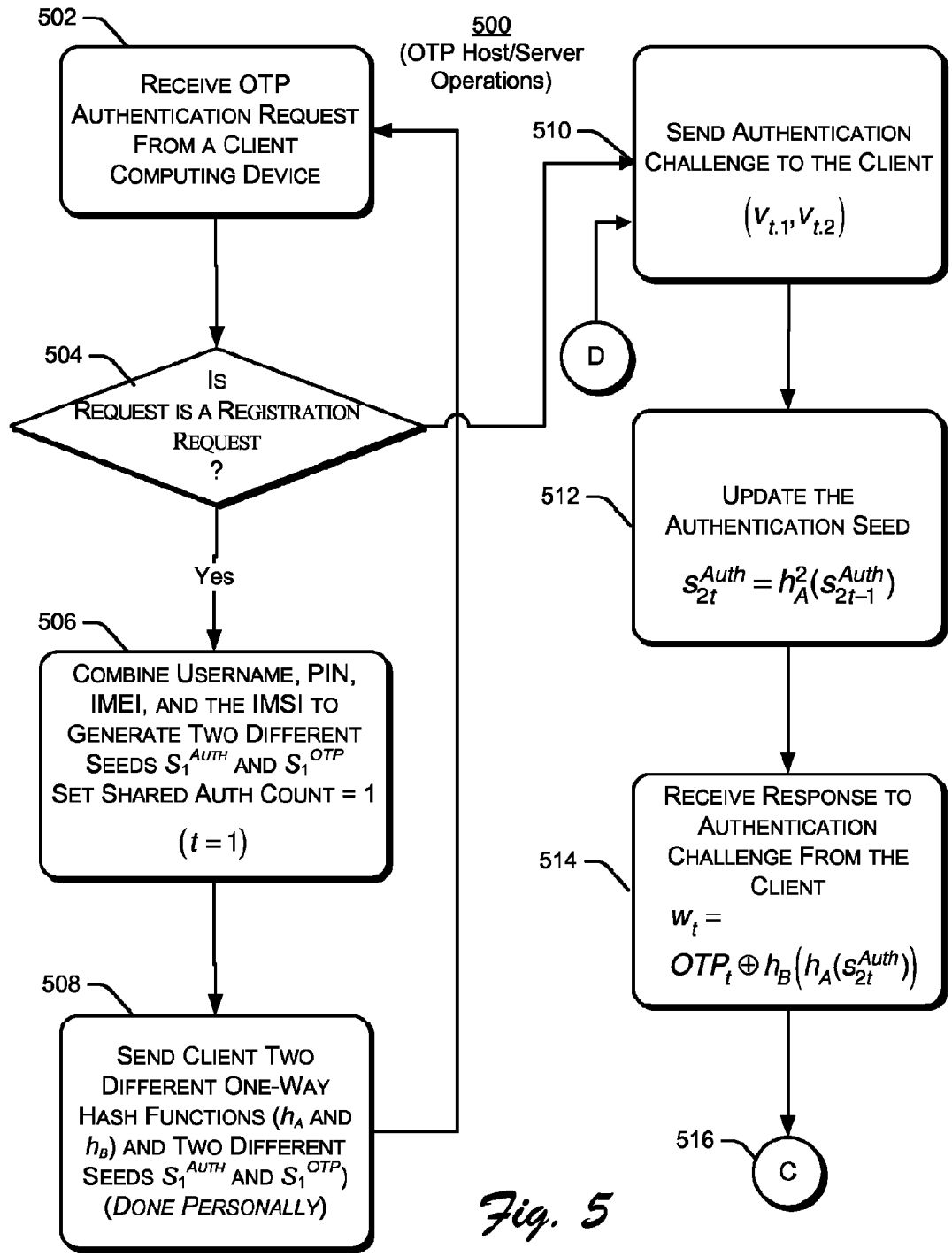
FIG. 5 shows an exemplary procedure for authentication server-side operations associated with OTP authentication with infinite nested hash chains, according to one embodiment.

FIG. 5 shows an exemplary procedure 500 for server-side operations associated with OTP authentication with infinite nested hash chains, according to one embodiment. At block 502, the server 102 (FIG. 1) receives an OTP authentication request from a client computing device 106. At block 504, the server determines whether the received request is a registration request (i.e., an initial authentication request). If not, operations continue at block 510, as described below. If the received request is a registration request, operations of block 506 combined information received from a client to generate two different seeds. Additionally, the authentication count "t" is equal to one "1". At block 508, the host server sends the client two different one-way hash functions and the two different seeds (having been calculated) for authentication and OTP generation. At block 510, the server sends an authentication challenge to the client device. At block 512, the server updates the authentication seed. At block 514, a server receives a response to the authentication challenge. If the procedure continues in FIG. 6 at block 602 as indicated by on-page reference "C."

Figure 6:
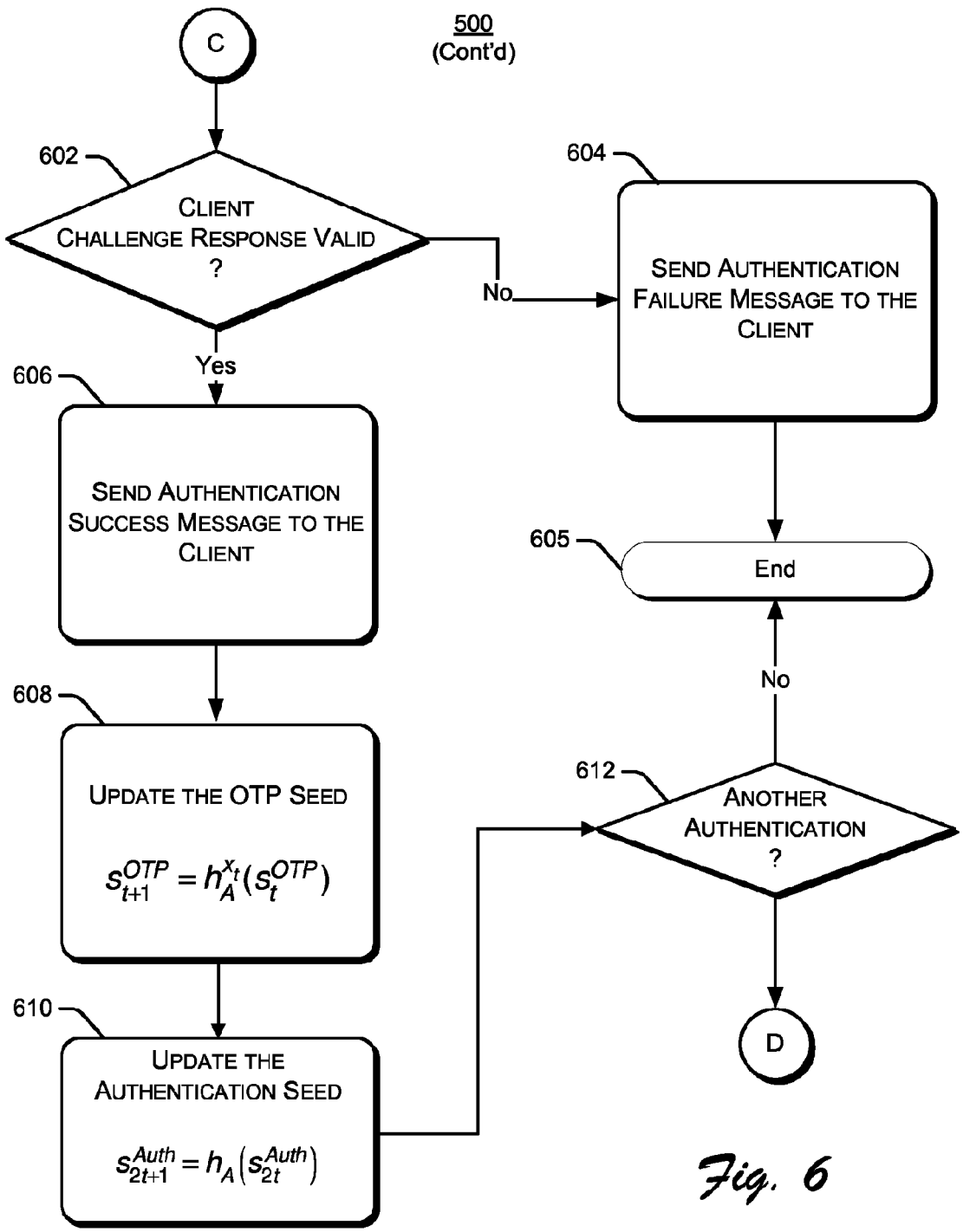
FIG. 6 shows further aspects of the exemplary procedure of FIG. 5 for authentication server-side operations associated with OTP authentication with infinite nested hash chains, according to one embodiment.

FIG. 6 shows further exemplary aspects of procedure 500 of FIG. 5 for server-side operations associated with OTP authentication with infinite nested hash chains, according to one embodiment. At block 602, the server 102 (FIG. 1) checks the authenticity of the client response to the authentication challenge. If the client challenge response is an authentication failure, operations continue at block 604, wherein the server sends an authentication failure message to the client. At block 605, the procedure terminates. If operations of block 602 determine that the authentication response is legitimate, operations continue at block 606, wherein the server sends an authentication success message to the client. At block 608, the server updates the OTP seed. At block 610, the server updates the authentication seed. At block 612, the server determines whether the client is requested another authentication. If so, operations continue in FIG. 5 at block 512, as indicated by on-page reference "D."

The exemplary procedures of FIGS. 2 through 6 are generalized in TABLE 4.

TABLE 4

An Exemplary Generalization

Registration Phase

User & Host: $h_A(\bullet), h_B(\bullet), s^{Auth}$, and $s^{OTP}$

Login and Authentication Phase

User("U") ← Host("H"): $(v_{t.1}, v_{t.2}) =$
$((x_t, y_t) \oplus h_B(h_A^2(s_{2t-1}^{Auth})), s_{2t-1}^{Auth} \oplus h_B(h_A(s_{2t-1}^{Auth})))$ U: check
$v_{t.2} \oplus h_B(h_A(s_{2t-1}^{Auth})) \stackrel{?}{=} s_{2t-1}^{Auth}$ U: extract $(x_t, y_t) = v_{t.1} \oplus h_B(h_A 2(s_{2t-1}^{Auth}))$
U: calculate $OTP_t = h_B^{x_t}(h_A^{y_t}(s_t^{OTP}))$
U: update $s_{2t}^{Auth} = h_A^2(s_{2t-1}^{Auth})$ user and host
User → Host: $w_t = OTP_t \oplus h_B(h_A(s_{2t}^{Auth}))$ H: check
$OTP_t \stackrel{?}{=} w_t \oplus h_B(h_A(s_{2t}^{Auth}))$ H & U: update $s_{t+1}^{OTP} = h_A^{x_t}(s_t^{OTP})$
$s_{2t+1}^{Auth} = h_A(s_{2t}^{Auth})$ Security Analysis The exemplary procedures of FIGS. 2 through 6 and TABLE 4 can resist an off-line guessing attack because it uses strong passwords of strong hash functions. Moreover, the gaining of unauthorized access by replaying reusable passwords is restricted by encoding passwords, which are used once.

Pre-Play Attack

Unless the challenge is protected, a type of "suppress-replay attack" (known as a "pre-play attack") becomes possible [13]. Consider that an intruder E, who is able to predict the next challenge, wishes to impersonate A to B. E takes the B role, by impersonating it to A, and asks A to authenticate itself. E chooses the next challenge that will be chosen by B when authenticating A. The challenge's response sent by A is memorized by E. Then, at some future time, E can impersonate A to B, using this memorized response. In contrast, system 100 allows the host to challenge the user with unpredictable uniformly distributed values of $x_t$ and $y_t$. If we suppose that $x_t$ and $y_t$ can take one value of forward m values, the probability of successfully guessing a challenge will be the joint probability of $x_t$ and $y_t$, which is equal to $1/m^2$. We can refer to this property as the ability to resist predictable attacks. The restriction of transferring password information in just one direction, from user to host, also increases the robustness against this type of attack. The two exchanged vectors between user and host are transferred in a cipher format.

Non-repudiation Attack

To prevent the non-repudiation attack, the user and host update the authentication seed, $s^{Auth}$, twice per session. Hence, the user updating will be used as the host's next verifier, and vice versa, so that any unauthorized modification of the exchanged vectors will be detected by the authentication partners.

Forgery Attack

To mount a forgery attack on the procedures of system 100, an adversary must generate an authentication message corresponding to the given $(v_{t.1}, v_{t.2})$ vector. Since the adversary does not know $s_{2t-1}^{Auth}$ and $s_t^{OTP}$, the adversary cannot correctly update the authentication seed nor correctly produce the session $OTP_t$ that will be accepted by the host. Hence, the proposed scheme can resist the forgery attack.

Insider Attack

If a host insider tries to impersonate the user to access other hosts using the shared OTPs between them, the host insider will not be able to do so because the cooperation of the OTPs' seed fabrication between this user and the different hosts is strong. Furthermore, as the OTP production, using two different types of strong hashes, $h_A(\bullet)$ and $h_B(\bullet)$, is strong, the host insider cannot derive those OTPs by performing an off-line guessing attack on what he has received.

Small Challenge Attack

Attacks based on sending small challenges by intruders who impersonate the communication host only affect the backward hash chains' OTPs. The described procedures of system 100 utilizes forward hashing techniques, which eliminates this type of attack completely.

Mutual Authentication

The host is authenticated to the user by checking the equality of $$v_{t.2} \oplus h_B(h_A(s_{2t-1}^{Auth})) \stackrel{?}{=} s_{2t-1}^{Auth}$$

and also the user is authenticated to the host by verifying $$OTP_t \stackrel{?}{=} w_t \oplus h_B(h_A(s_{2t}^{Auth})).$$

This confirms the occurrence of the two-way authentication.

Reparability

If the user finds or suspects that $s^{Auth}$ or $s^{OTP}$ has been compromised, e.g., token theft, the client device can re-register with the host and agree upon new authentication and OTPs' seeds.

Alternate Implementations

Although the systems and methods for OTP authentication with infinite nested hash chains have been described in language specific to structural features and/or methodological operations or actions, it is understood that the implementations defined in the appended claims are not necessarily limited to the specific features or actions described. For example, although the executable program modules of FIG. 1 for illustrated discrete blocks, it is understood that such programs and components may reside at various times in different storage components operatively coupled to the respective computing devices. In another alternative example, the systems and procedures described herein can be implemented in hardware, or a combination of hardware, software, and/or firmware. For instance, one or more application specific integrated circuits (ASICs) can be programmed to carry out one or more of the systems and procedures described herein.

In yet other examples, although the system 100 has been described for use in an environment for SMS banking authentication, the operations of system 100 are applicable to other environments including remote online banking transactions, such as online shopping in e-commerce; healthcare industry; secure remote data access (in general); authenticated login systems and servers; and setting up strong, shared keys between parties that only share an OTP value.

Accordingly, the specific features and operations of system 100 for OTP authentication with infinite nested hash chains are disclosed as exemplary forms of implementing the claimed subject matter.

References

This specification refers to one or more of the following references:

[1] H. Kim, H. Lee, K. Lee, and M. Jun. "A Design of One-Time Password Mechanism Using Public Key Infrastructure." Networked Computing and Advanced Information Management, vol. 1, pp. 18-24, 2008.

[2] L. Lamport, "Password Authentication with Insecure Communication." Comm. ACM, vol. 24, No 11, pp. 770-772, 1981.

[3] N Haller, "The S/KEY One-Time Password System", Proceedings of the ISOC Symposium on Network and Distributed System Security, pp. 151-157, February 1994.

[4] http://www.rsa.com/node.aspx?id=1156 [Accessed May 4, 2010].

[5] R. Rivest, and A. Shamir. "Payword and micro-mint: Two simple micropayment schemes", pages 7-11, 1996.

[6] A. Chefranov. "One-Time Password Authentication with Infinite Hash Chains." Novel Algorithms and Techniques In Telecommunications, Automation and Industrial Electronics, pp. 283-286, August 2008.

[7] V. Goyal, A. Abraham, S. Sanyal, and S. Han, "The N/R one time password system." in Proceedings of International Conference on Information Technology: Coding and Computing (ITCC'05), April, 2005, vol. 1, pp. 733-738, 2005.

[8] K. Bicakci and N. Baykal, "Infinite length hash chains and their applications." in Proceedings of $11^{th}$ IEEE Int. Workshops on Enabling Technologies: Infrastructure for Collaborating Enterprises (WETICE'02), pp. 57-61, 2002.

[9] R. Rivest, A. Shamir, L. Adleman, "A method for obtaining digital signatures and public-key cryptosystems". Communications of the ACM, 21(2), 1978.

[10] Muhammad Khurram Khan, Khaled Alghathbar, "Cryptanalysis and Security Improvements of 'Two-Factor User Authentication in Wireless Sensor Networks'", Sensors, Vol. 10, Issue 3, pp. 2450-2459, March 2010.

[11] T. Yeh, H. Shen, and J. Hwang, "A secure one-time password authentication scheme using smart cards." IEICE Trans. Commun., vol. E85-B, No. 11, pp. 2515-2518, 2002.

[12] D. Yum and P. Lee, "Cryptanalysis of Yeh-Shen-Hwang's one-time password authentication scheme." IEICE Trans. Commun., vol. E88-B, No. 4, pp. 1647-1648, 2005.

[13] C. Mitchell, and L. Chen, "Comments on the S/KEY user authentication scheme." ACM Operating System Review, vol. 30, no. 4, pp. 12-16, October 1996.

[14] F. Aloul, S. Zahidi, W. El-Hajj, "Two factor authentication using mobile phones." IEEE/ACS International Conference on Digital Object Identifier, pp. 641-644, 2009.

[15] H. Raddum, L. Nestas, and K. Hole, "Security Analysis of Mobile Phones Used as OTP Generators." IFIP International Federation for Information Processing, pp. 324-331, 2010.

[16] Muhammad Khurram Khan, "Fingerprint Biometric-based Self and Deniable Authentication Schemes for the Electronic World", IETE Technical Review, vol. 26, issue 3, pp. 191-195, May-June, 2009.

[17] Muhammad Khurram Khan, Jiashu Zhang, "Improving the Security of 'A Flexible Biometrics Remote User Authentication Scheme'", Computer Standards and Interfaces (CSI), Elsevier Science, UK, vol. 29, issue 1, pp. 84-87, January 2007.

The invention claimed is:

1. A method comprising:
providing, by a client computing device registration information to a one-time password (OTP) authentication server; and
generating, by the client computing device via the OTP authentication server, an authenticated OTP with infinite nested hash chains, the generating using a first hash function ($h_A(\cdot)$) for updating a seed chain, a second hash function ($h_B(\cdot)$) for OTP production, an OTP seed number $s_t^{OTP}$ for a $t^{th}$ authentication, and two authentication seeds of numbers $s_{2t-1}^{Auth}$ and $s_{2t}^{Auth}$, for the $t^{th}$ authentication.

2. The method of claim 1 wherein the client computing device is a mobile telephony device.

3. The method of claim 2 wherein registration information comprises an International Mobile Equipment Identity and an International Mobile Subscriber Identity.

4. The method of claim 1 wherein the providing is an initial registration phase with the OTP authentication server, wherein t=1, and wherein the method further comprises receiving, responsive to the providing, the first hash function, the second hash function, the OTP seed number, and the authentication seed number.

5. The method of claim 1 wherein the generating further comprises:
receiving an authentication challenge vector ($v_{t,1}, v_{t,2}$) from the OTP authentication server; and
responding to the authentication challenge based at least in part on information associated with the authentication challenge vector.

6. The method of claim 5 wherein responding to the authentication challenge further comprises:
updating the authentication seed according to $s_{2t}^{Auth} = h_A^2(s_{2t-1}^{Auth})$; and
wherein responding to the authentication challenge is implemented according to $w_t = OTP_t \oplus h_B(h_A(s_{2t}^{Auth}))$.

7. The method of claim 5 wherein responding to the authentication challenge further comprises:

calculating a local seed authentication value based on authentication registration information provided to the OTP authentication server;

extracting $s_{2t-1}^{Auth}$ from $v_{t.2}$ (extracted authentication seed for $t^{th}$ authentication); and if the local seed authentication value is different than the extracted authentication seed, terminating the method with an authentication failure indication.

8. The method of claim 7 wherein extracting is implemented according to $v_{t.2} \oplus h_B(h_A(s_{2t-1}^{Auth}))$.

9. The method of claim 7 wherein the local seed authentication value is equal to the extracted authentication seed, and wherein responding to the authentication challenge further comprises:

determining a challenge core $(x_t, y_t)$ from received vector $v_{t.1}$;

calculating an $OTP_t$ based on the challenge core; and communicating the $OTP_t$ to the OTP authentication server.

10. The method of claim 9 wherein the challenge core is determined according to $$(x_t, y_t) = v_{t.1} \oplus h_B(h_A^2(s_{2t-1}^{Auth})).$$

11. The method of claim 5, further comprising:

receiving, responsive to responding to the authentication challenge, an authentication result from the OTP authentication server;

if the authentication result indicates a successful authentication, for a next authentication:
  incrementing authentication count "t"; and
  updating the OTP seed number.

12. A computing device comprising a processor operatively coupled to a memory, the memory comprising computer-program instructions executable by the processor to perform operations comprising:

providing a one-time password (OTP) authentication server with registration information; and generating, with assistance of the OTP authentication server, an authenticated OTP with infinite nested hash chains, the generating using a first hash function ($h_A(\bullet)$) for updating a seed chain, a second hash function ($h_B(\bullet)$) for OTP production, an OTP seed number $s_t^{OTP}$ for a $t^{th}$ authentication, and two authentication seeds of numbers $s_{2t-1}^{Auth}$ and $s_{2t}^{Auth}$ for the $t^{th}$ authentication.

13. The computing device of claim 12 wherein the computing device is a mobile telephony device.

14. The computing device of claim 12 wherein the generating further comprises:

receiving an authentication challenge vector $(v_{t.1}, v_{t.2})$ from the OTP authentication server; and responding to the authentication challenge based at least in part on information associated with the authentication challenge vector.

15. A non-transitory computer-readable medium comprising computer-program instructions executable by a processor, the computer-program instructions when executed by the processor for performing the method of claim 1.

16. A system comprising client-computing device and an OTP authentication server, coupled over a network, and operatively configured to perform the method of claim 1.

17. A method for a One Time Password (OTP) authentication server device (server), the method comprising:

receiving an OTP authentication request from a client computing device; and generating an authenticated OTP with infinite nested hash chains, the generating using a first hash function ($h_A(\bullet)$) for updating a seed chain, a second hash function ($h_B(\bullet)$) for OTP production, an OTP seed number $s_t^{OTP}$ for a $t^{th}$ authentication, and two authentication seeds of numbers $s_{2t-1}^{Auth}$ and $s_{2t}^{Auth}$, for the $t^{th}$ authentication; and wherein the authenticated OTP is based on authentication registration information received from the client-computing device.

18. The method of claim 17 wherein the authentication registration information comprises an International Mobile Equipment Identity and an International Mobile Subscriber Identity pertaining to the client computing device.

19. The method of claim 17 wherein the receiving represents an initial registration phase by the client computing device with the server wherein t=1, and wherein the method further comprises:

combining the authentication registration information to generate the OTP seed number and the authentication seed number; and sending, responsive to the initial registration phase, the client computing device the first hash function, the second hash function, the OTP seed number, and the authentication seed number.

20. The method of claim 17, before the step of generating, further comprising:

sending the client computing device in authentication challenge $(v_{t.1}, v_{t.2})$; and receiving, responsive to sending the authentication challenge, a response to the authentication challenge, the response being based at least in part on information provided in the authentication challenge;

if the response is not a valid response to the authentication challenge, communicating, to the client computing device, an authentication failure message;

if the response is a valid response, and for a next authentication:

updating the authentication seed $s_{2t+1}^{Auth} = h_A(s_{2t}^{Auth})$; and
updating the OTP seed $s_{t+1}^{OTP} = h_A^{x_t}(s_t^{OTP})$.

* * * * *